US 7,630,978 B2

(12) United States Patent
Li et al.

(10) Patent No.: US 7,630,978 B2
(45) Date of Patent: Dec. 8, 2009

(54) QUERY REWRITING WITH SPELL CORRECTION SUGGESTIONS USING A GENERATED SET OF QUERY FEATURES

(75) Inventors: Xin Li, Sunnyvale, CA (US); Nawaaz Ahmed, San Francisco, CA (US); Fuchun Peng, Sunnyvale, CA (US); Yumao Lu, Santa Clara, CA (US)

(73) Assignee: Yahoo! Inc., Sunnyvale, CA (US)

( * ) Notice: Subject to any disclaimer, the term of this patent is extended or adjusted under 35 U.S.C. 154(b) by 141 days.

(21) Appl. No.: 11/639,492

(22) Filed: Dec. 14, 2006

(65) Prior Publication Data

US 2008/0147637 A1 Jun. 19, 2008

(51) Int. Cl.
G06F 17/30 (2006.01)
(52) U.S. Cl. .............................. 707/5; 707/3
(58) Field of Classification Search .............. None
See application file for complete search history.

(56) References Cited

U.S. PATENT DOCUMENTS

| | | | |
|---|---|---|---|
| 5,987,457 A | 11/1999 | Ballard | |
| 6,047,299 A | 4/2000 | Kaijima | |
| 6,212,517 B1 | 4/2001 | Sato et al. | |
| 6,385,350 B1 | 5/2002 | Nicholson et al. | |
| 6,401,084 B1 | 6/2002 | Ortega et al. | |
| 6,411,950 B1 | 6/2002 | Moricz et al. | |
| 6,421,675 B1 | 7/2002 | Ryan et al. | |
| 6,460,037 B1 | 10/2002 | Weiss et al. | |
| 6,701,309 B1 | 3/2004 | Beeferman et al. | |
| 6,883,001 B2 | 4/2005 | Abe | |
| 7,117,207 B1* | 10/2006 | Kerschberg et al. ............ | 707/5 |
| 7,127,450 B1 | 10/2006 | Chang et al. | |
| 7,146,358 B1 | 12/2006 | Gravano et al. | |
| 7,194,684 B1 | 3/2007 | Shazeer | |
| 7,254,773 B2 | 8/2007 | Bates et al. | |
| 7,296,019 B1 | 11/2007 | Chandrasekar et al. | |
| 2002/0059220 A1 | 5/2002 | Little | |
| 2002/0194229 A1 | 12/2002 | Decime et al. | |
| 2004/0002994 A1 | 1/2004 | Brill et al. | |
| 2005/0149499 A1 | 7/2005 | Franz et al. | |
| 2006/0161520 A1 | 7/2006 | Brewer et al. | |
| 2006/0294067 A1 | 12/2006 | Halcrow et al. | |
| 2007/0078828 A1* | 4/2007 | Parikh et al. ................... | 707/3 |
| 2008/0104037 A1* | 5/2008 | Bierner ......................... | 707/3 |
| 2008/0120276 A1* | 5/2008 | Chennavasin ................ | 707/3 |

(Continued)

OTHER PUBLICATIONS

Han et al, "Intelligent Query Answering by Knowledge Discovery Techniques", IEEE Transactions on knowledge and data engineering, vol. 8, No. 3, Jun. 1996, 18 pages.*

(Continued)

*Primary Examiner*—Uyen T. Le
(74) *Attorney, Agent, or Firm*—Hickman Palermo Truong & Becker LLP; Daniel D. Ledesma (57) ABSTRACT

Techniques for rewriting queries submitted to a query engine are provided. A query is submitted by a user and sent to a search mechanism. Based on the query, one or more query suggestions are generated. Features are generated based on the query and the query suggestions. Those features are input to a trained machine learning mechanism that generates a rewrite score. The rewrite score signifies a confidence score that indicates how confident the search mechanism is that the user intended to submit the original query. If the rewrite score is below a certain threshold, then the original query is rewritten to a second query. Results of executing the original query may be sent to the user along with a reference to the second query. Additionally or alternatively, results of executing the second query are sent to the user.

32 Claims, 3 Drawing Sheets

U.S. PATENT DOCUMENTS

2008/0208825 A1* 8/2008 Curtis et al. .................. 707/3

OTHER PUBLICATIONS

Liu et al, "Personalized Web Search for Improving Retrieval Effectiveness", IEEE Transactions on knowledge and data engineering, 2004, 35 pages.*

Cuppens et al, "Cooperative Answering: a methodology to provide intelligent access to databases", Proceedings 2nd International conference on Expert Database Systems, 1989, 21 pages.*

Tabke, Brett, "The Google FAQ by Webmasters for Webmasters", http://referencementweb.hautetfort.com/files/google_kbase.pdf , Apr. 2002, 32 pages.

Bookface-GA, "Search Term Suggestion Tool Available", http://answers.google.com/answers/threadview?id=18072 , May 2002, 2 pages.

* cited by examiner

QUERY REWRITING WITH SPELL CORRECTION SUGGESTIONS USING A GENERATED SET OF QUERY FEATURES

FIELD OF THE INVENTION

The present invention relates to search engines, and in particular, to determining whether and how to rewrite a search query.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

A search engine is a computer program that helps a user to locate information. Using a search engine, a user can enter one or more search query terms and obtain a list of resources that contain or are associated with subject matter that matches those search query terms. While search engines may be applied in a variety of contexts, search engines are especially useful for locating resources that are accessible through the Internet. Resources that may be located through a search engine include, for example, files whose content is composed in a page description language such as Hypertext Markup Language (HTML). Such files are typically called pages. One can use a search engine to generate a list of Universal Resource Locators (URLs) and/or HTML links to files, or pages, that are likely to be of interest.

Some search engines order a list of files before presenting the list to a user. To order a list of files, a search engine may assign a rank to each file in the list. When the list is sorted by rank, a file with a relatively higher rank may be placed closer to the head of the list than a file with a relatively lower rank. The user, when presented with the sorted list, sees the most highly ranked files first. To aid the user in his search, a search engine may rank the files according to relevance. Relevance is a measure of how closely the subject matter of the file matches query terms.

To find the most relevant files, search engines typically try to select, from among a plurality of files, files that include many or all of the words that a user entered into a search request. Unfortunately, the files in which a user may be most interested are too often files that do not literally include the words that the user entered into the search request. If the user has misspelled a word in the search request, then the search engine may fail to select files in which the correctly spelled word occurs.

Worse yet, a user may enter, into a search request, a word that is a correctly spelled word, but that is not the word that means the thing for which the user desires to search. For example, a user who wants to find files that include information about "Silicon Valley" may, through ignorance or by accident, request a search for "Silicone Valley". Because "Silicone" is a correctly spelled word, a spelling checking program will not detect any error. Under such circumstances, the user is likely to obtain a list of results that have little to do with what the user was actually looking for.

A user may successfully enter a search request that includes correctly spelled words that are used in the correct context. Even in this case, a search engine may fail to return many existing files that include information in which the user would be very interested. Search results may be under-inclusive for a variety of reasons. A verb in the search request may be in a different verb tense than the verbs contained in the files. A noun in the search request may be expressed in the plural form while the nouns in the files are expressed in the singular form. A word may have more than one correct spelling, and the spelling used in the files might be different than the spelling that the user selected. The words included in the files may be synonyms of the words that the user entered into the search request. For any of these or other reasons, a search engine may return sub-optimal results.

Typically, 8-10% of queries to Web search engines have at least one query term that is misspelled. Some deceitful website developers (known as "spammers) design their websites to target popular misspellings. By targeting popular misspellings, spammers attract unsuspecting Web users to visit their respective websites, which may result in increased advertisement revenue for the spammers. For example, a relatively common misspelling is "Brittney Spears", the correct spelling being "Britney Spears". A website that has nothing to do with celebrities or Hollywood may include "Brittney Spears" in one or more webpages of the website in order for those webpages to appear in search results of queries with that misspelling.

To address the problem of correcting query misspellings, techniques have been developed for suggesting alternative spellings. Such techniques are described, for example, in U.S. patent application Ser. Nos. 10/364,078 and 10/788,970, both entitled SUGGESTING AN ALTERNATIVE TO THE SPELLING OF A SEARCH QUERY, respectively filed on Feb. 10, 2003 and Feb. 27, 2004, both of which are incorporated by reference as if fully set forth herein.

In one approach for correcting query spellings, a spelling correction mechanism: (1) generates, based on a submitted query, multiple query suggestions; and (2) provides the top ranked query suggestion to the user. There are at least two problems with this approach.

First, the top ranked query suggestion may not be associated with a relatively high degree of confidence. Moreover, other query suggestions may have rankings that are similar with, albeit lower than, the ranking of the top query suggestion. Therefore, the actual intention of the user may not be reflected solely in the top ranked query suggestion, thus contributing to the relatively high error rate (i.e., 20-30%) of the above approach.

Second, in attempting to correct perceived misspellings, a spelling correction mechanism may modify queries that do not need modifying. For example, a user may submit "walmark" as the query. Even though "walmark" is the name of a real company, the spelling correction mechanism may erroneously suggest "walmart" to the user because "walmart" may be a more popular search and it is only different than "walmark" by one letter.

What is needed is an improved mechanism for predicting user intent based on a user's query in order to provide useful query suggestions and/or search results.

DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

In order to have a higher level of confidence in providing modified queries (i.e. "rewriting" a query) to a user, a machine learning mechanism is introduced to a search mechanism that also comprises a query suggestion server (QSS). In response to a query from a user, multiple query suggestions are generated using the QSS. The QSS generates, for each query suggestion, at least one confidence score that represents how confident (e.g., on a scale between 1 and 10) the QSS is that the corresponding query suggestion is what the user actually intended when the user submitted the original query. Instead of merely choosing the query suggestion from the QSS with the highest confidence score, a machine learning mechanism is used to determine whether the original query should be rewritten at all. If so, another component of the search mechanism is used to determine how to rewrite the query.

The machine learning mechanism is trained using data that associates submitted queries with indications of whether the submitted queries should be rewritten. Additionally or alternatively, the association may also include alternate queries to which the submitted queries may be rewritten.

An original query may be rewritten in multiple ways, such as by simply replacing the original query with one of the query suggestions. Another way is to blend one or more terms of one or more query suggestions with one or more terms of the original query, thus accounting for most (if not all) possible intents of the user.

Other techniques for determining whether to rewrite a query include comparing the original query (1) to a "white list" of queries that should be rewritten and (2) to a "black list" of queries that should not be rewritten. If the original query is in the black list, then the QSS and machine learning mechanism are not invoked. If the original query is in the white list, then the machine learning mechanism is used to determine how the original query should be rewritten.

Although the following description is provided in the context of the World Wide Web (WWW) and the Internet, embodiments of the invention are not limited to that context. For example, such embodiments may be implemented in a search for any type of item, including books, images, videos, people, etc.

As used hereinafter, a "query" comprises one or more terms, where each term is a string of one or more characters. Therefore, "j9*" is an example of a possible term. However, examples of terms used in typical Web queries include words from a known language, a price, a product number, an ISBN number, etc.

Example Query Rewriting Architecture

Figure 1:
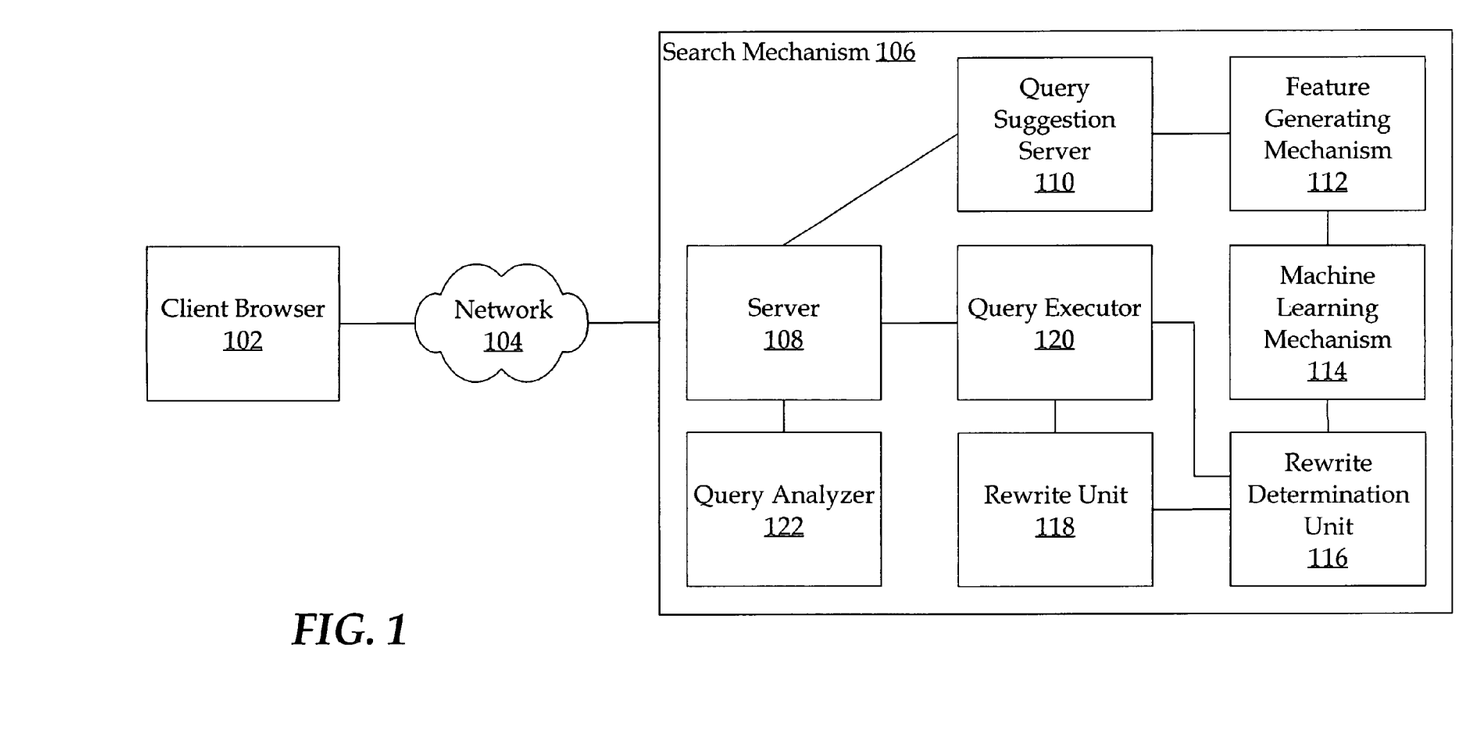
FIG. 1 is a block diagram that illustrates an example architecture for processing a search query and determining whether the search query should be rewritten, according to an embodiment of the invention.

FIG. 1 is a block diagram that illustrates an example architecture for processing a search query and determining whether the search query should be rewritten, according to an embodiment of the invention. A user instructs a client browser 102 (e.g., Mozilla Firefox) to submit a query to a search mechanism 106 via a network 104.

Network 104 may be implemented by any medium or mechanism that provides for the exchange of data between various nodes in the network. Examples of network 104 include, without limitation, a network such as a Local Area Network (LAN), Wide Area Network (WAN), Ethernet or the Internet, or one or more terrestrial, satellite, or wireless links. Network 104 may include a combination of networks such as those described. Network 104 may transmit data according to Transmission Control Protocol (TCP) and Internet Protocol (IP).

Search Mechanism

Search mechanism 106 comprises multiple components that are illustrated in block form. However, each block should not necessarily be interpreted to be a separate computing device. Search mechanism 106 may comprise one or more devices and each component may represent, for example, a software module or thread executing on one or more of those devices.

In the illustrated embodiment, search mechanism 106 comprises a server 108 for receiving queries, a query suggestion server (QSS) 110 for generating query suggestions, a feature generating mechanism 112 for generating features based on the original query and the query suggestions, a machine learning mechanism 114 for generating a rewrite score based on the features, a rewrite determination unit 116 for determining whether to rewrite the original query, a rewrite unit 118 for determining how to rewrite the original query, a query executor 120 for executing the original query and/or a different query, and a query analyzer 122 for performing offline analysis of, for example, which queries are rewritten, which search results are selected by users, etc.

As used hereinafter, the result of rewriting an original query is a "second query." A second query may itself comprise multiple queries. A second query is different than an original query in at least one term. For example, one term in the second query is different than any term in the original query and/or one term in the original query is different than any term in the second query.

In an alternative embodiment, search mechanism 106 does not comprise a server 108, in which case QSS 110 directly receives the queries coming through network 104.

Query Suggestion Server

QSS 110 may generate query suggestions from an original query in multiple ways. In one embodiment, QSS 110 uses the techniques described in U.S. patent application Ser. Nos. 10/364,078 and 10/788,970, both entitled SUGGESTING AN ALTERNATIVE TO THE SPELLING OF A SEARCH QUERY, filed on Feb. 10, 2003 and Feb. 27, 2004, respectively, both of which are incorporated by reference as if fully set forth herein.

In one embodiment, in addition to generating multiple query suggestions, QSS 110 also generates at least one confidence score for each query suggestion. The confidence score of a query suggestion represents how confident the QSS is that the query suggestion is what the user actually intended to submit. Both applications incorporated above describe approaches for generating confidence scores.

QSS 110 may generate multiple confidence scores for each query suggestion. In other words, QSS 110 may use different techniques to generate different confidence scores. One such technique, for example, is executing the query suggestion, examining the results, and determining a number of webpages (e.g., relative to the original query) in which all the terms of the query suggestion are found.

In one embodiment, three functions are used to generate confidence scores for the query suggestions. These functions are referred to hereinafter as F1, F2, and F3, respectively.

Table 1 is an example of query suggestions, based on original query "business hotel rates coporate", and their respective confidence scores according to F1, F2, and F3.

TABLE 1

| Query Suggestion | F1 | F2 | F3 |
| --- | --- | --- | --- |
| business hotel rates corporate | 0.9 | 0.6 | 0.8 |
| business hotel rates corporate | 0.3 | 0.2 | 0.3 |
| business hotel rates corporate | 0.2 | 0.3 | 0.1 |
| business hotel rates corporate | 0.5 | 0.7 | 0.4 |
| business hotel rates corporate | 0.2 | 0.1 | 0.3 |

Functions F1, F2, and F3 may also be used to generate confidence scores for the original query. For example, the confidence scores for the original query "business hotel rates coporate" may be 0.2, 0.4, and 0.3, respectively.

Feature Generating Mechanism

According to an embodiment, feature generating mechanism (FGM) 112 accepts as input the confidence scores associated with each query suggestion generated by QSS 110, and generates multiple features as output. A "feature" is the specification of an attribute and its value. As a simple example, color is an attribute, blue is a value, and "color is blue" is the feature. However, some technical literature on features and machine learning use "feature" and "attribute" as synonyms.

FGM 112 may generate any number of features from the confidence scores, the original query, and/or query suggestions. FGM 112 is not required to generate the same number and/or types of features for every submitted query.

For any given submitted query, there may be hundreds of features generated either offline or online. The following list provides just a few examples of possible feature attributes for which FGM 112 generates values.

Identical F1: the confidence score generated by applying F1 to the original query. Based on the example above, Identical F1 would be 0.2.

Identical F2: the confidence score generated by applying F2 to the original query. Based on the example above, Identical F1 would be 0.4.

Identical F3: the confidence score generated by applying F3 to the original query. Based on the example above, Identical F1 would be 0.3.

Top F1: the confidence score, of the top query suggestion, generated by applying F1 to the top query suggestion. For example, based on Table 1, Top F1 would be 0.9.

Top F2: the confidence score, of the top query suggestion, generated by applying F2 to the top query suggestion. For example, based on Table 1, Top F2 would be 0.7.

Top F3: the confidence score, of the top query suggestion, generated by applying F3 to the top query suggestion. For example, based on Table 1, Top F3 would be 0.8.

F1 DIFF: the difference between Top F1 and Identical F1 (Top F1−Identical F1). Based on the examples above, F1 DIFF would be 0.9−0.2=0.7.

F2 DIFF: the difference between Top F2 and Identical F2 (Top F2−Identical F2). Based on the examples above, F2 DIFF would be 0.7−0.4=0.3.

F3 DIFF: the difference between Top F3 and Identical F3 (Top F3−Identical F3). Based on the examples above, F3 DIFF would be 0.8−0.3=0.5.

Preload: Is the top suggestion a preload suggestion. QSS 110 may have a dictionary (white list) to directly provide suggestions for some query words. If the top suggestion contains any term loaded from the dictionary, then the preload may be set to 1; otherwise 0.

noIDpreload: Does the top suggestion contain a non-identity preload? If the preloaded term is identical to a term in the original query, then noIDpreload is set to 0; otherwise 1.

# of valid suggs: Number of query suggestions with F3 scores above a threshold?

# of all suggs: Number of query suggestions for the original query haveIdentical: Is there an identical suggestion in the top five? QSS 110 may also return the confidence scores for the original query. If any confidence score or a particular confidence score (e.g., F2) of the original query is ranked in the top five, then haveIdentical is set to 1; otherwise 0.

DIFF in # of tokens: the difference between the original query and the top query suggestion of F2.

Levenshtein DIST: edit distance between the original query and the top query suggestion (of F2).

The values of each feature may be on any scale, such a 0-1.0 or 0-100. In other embodiments, FGM 112 may not use confidence scores (e.g., from F1, F2, and F3) and their derivatives as features.

Although the description above stated that QSS 110 generates the one or more confidence scores for each query suggestion, FGM 112 may instead generate those confidence scores. In that embodiment, QSS 110 generates the query suggestions and FGM 112 generates all (or at least most) features for each query suggestion.

Machine Learning Mechanism

According to an embodiment, machine learning mechanism (MLM) 114 accepts as input the features generated from QSS 110 and FGM 112, and generates a "rewrite score" as output. The rewrite score indicates how confident search mechanism 106 is that the user intended to submit a query other than the original query.

Embodiments of the invention are not limited to any particular machine learning mechanism. MLM 114 may be, for example, a support vector machine (SVM) or a neural network.

Training Data

With the aim of providing consistent results, MLM 114 is trained with training data. Such training data may comprise a 3-tuple: an original query, a query suggestion, and an indication whether the original query should be rewritten with the query suggestion.

Each 3-tuple may be characterized as a "good" example or an "ambiguous" example. An example of a good 3-tuple is <"kelly blue book"><"kelley blue book"><Yes>. An example of an ambiguous 3-tuple is <"Walmark"><"Walmart"><No>. Ambiguous examples include original queries that a MLM 114 would be tempted to rewrite but, because of the knowledge and/or experience of a person or program, it would be wrong to do so.

Generating Training Data

Multiple people may compose the training data. On the other hand, a software program may generate the training data. The training data may be generated from the same or similar logic that is used to generate the white list and black list, described in detail below. Additionally or alternatively, the training data comprises at least the entries in the white list and/or black list.

MLM 114 typically comprises a single function. As more training data is provided to MLM 114, MLM 114 becomes more accurate in predicting the intent of users that submit queries. In other words, the function that represents MLM 114 may continuously adjust based on the training data. Thus, even after MLM 114 begins generating rewrite scores, MLM 114 may be further trained based on additional training data.

Rewrite Determination Unit

According to an embodiment, rewrite determination unit (RDU) 116 determines, based on the rewrite score, whether the original query should be rewritten. In one embodiment, RDU 116 compares the rewrite score against a rewrite threshold value. If the rewrite score is at or greater than the rewrite threshold value, then the original query is rewritten using rewrite unit 118.

In determining whether to rewrite a query, RDU 116 may take into account multiple factors other than the rewrite score, such as the quality of the results of executing a particular query. For example, if the results of executing the original query include many links to webpages that have low relevance scores or are from known spam websites, then it is more likely that the original query should be rewritten.

In one embodiment, some mechanism other than RDU 116 analyzes the results of executing the original query and/or a query suggestion.

Query Rewrite Unit

According to an embodiment, after RDU 116 determines that an original query should be rewritten, query rewrite unit (QRU) 118 determines how to rewrite the original query.

QRU 118 may rewrite the original query in at least two ways. First, the query suggestion with the highest score from QSS 110 (i.e., relative to the scores of the other query suggestions) is selected as the query to be executed, e.g., by query executor 120. The query suggestion may simply be the original query with a correctly spelled word replacing a misspelled word.

Second, if the rewrite score generated by MLM 114 does not represent a high enough confidence level, then QRU 118 rewrites the original query by blending terms from multiple query suggestions by using the logical OR. Alternatively, QRU 118 rewrites the original query by blending the terms from the original query and terms from one or more query suggestions.

For example, suppose the original query is "james trevsion" and that the query suggestion "james trevison" is associated with the highest score. QRU 118 (or some other component of search mechanism 106) may determine that executing the original query still provides "good" results (e.g., references to webpages with high relevance scores and that are non-spam webpages with the name "james trevsion"). QRU 118 may also determine that it is likely that the user intended to submit "james trevison" as the query because executing that query also provides good results (and, for example, that query has been relatively popular recently). Many factors may be used to determine whether to blend terms from multiple queries. Thus, in this example, the second query may be either (1) "(james trevsion) OR (james trevison)" or (2) "james AND (trevsion OR trevison)". Executing one of these queries will generate references to webpages that include the word "james" and at least one of "trevsion" and "trevison".

To extend this example, suppose another query suggestion is "james trevisen". The second query may then be "james AND (trevsion OR trevison OR trevisen)".

Weighting Terms in a Second Query

Each term may be given a particular weight, which may be used when executing a second query. Given the immediately previous example, a component of search mechanism 106 may determine that it is slightly more likely that the user intended to write "trevison" rather than "trevsion" and "trevisen". Accordingly, search mechanism 106 associates the following weights with the three possible terms, respectively: 0.48, 0.33, and 0.19.

If using relevance scores of webpages is the mechanism by which the results (i.e., references to webpages) of executing the second query are sorted and displayed to the user, then the weights assigned to the terms will be taken into account when calculating the overall relevance score of the corresponding webpages.

Alternatively, the weights that are assigned to terms may be taken into account after the corresponding webpages are assigned relevance scores. In this latter case, the weights are used to determine a "presentation ranking" of the references. A "presentation ranking" determines how many references (i.e., corresponding to each term) are displayed and/or an order in which the references are displayed. Extending the above example, if a search results page has enough room for ten references, then there may be five references to webpages that contain "trevison", three references to webpages that contain "trevsion", and two references to webpages that contain "trevisen". Furthermore, the manner in which the references are displayed to the user may also be blended. For example, the first two references in the list may be to webpages that contain "trevison", the third reference in the list may be to a webpage that contains "trevsion", and so forth.

Executing a Query

According to an embodiment, the query that is selected as the "final query" to execute (i.e., the original query or the second query) is executed using query executor 120. Query executor 120 may be any search engine, such as the search engine provided by Yahoo!™. The results of executing the final query are sent to the user to be displayed. In the example of blending terms from different queries, query executor 120 may determine in what order the references are displayed.

If the final query is the second query, then the results page may include an override feature in the form of a link to the original query. If the user selects the link, then results of executing the original query are sent to the user.

The result of executing the original query will be referred to hereinafter as "original query results" and the results of executing a second query will be referred to hereinafter as "second query results".

In one embodiment, even if RDU 116 determines that the original query should be rewritten, original query results may still be sent to the user rather than second query results. In another embodiment, a blending of original query results and second query results are sent to the user. In either embodiment, references to webpages in the search results may be filtered, e.g., based on the likelihood that the webpages are from spam websites.

Benefits of Blending Query Terms

Blending one or more terms from multiple queries is useful for several reasons. First, two or more spellings of a term may be valid in which case the user probably intended at least one of those spellings. Therefore, each or the spellings should be included in the second query. Second, if the rewrite score is associated with a low confidence score (e.g., the difference between the rewrite score and the rewrite threshold value is relatively small), then executing a second query that blends terms from multiple queries is similar to executing multiple queries, where one of the multiple queries represents the likely intent of the user. Third, through blending, it is possible to assign more weight to the user formulation of a term when the rewrite score is associated with a relatively low confidence score.

Data Mining

Search mechanism 106 may include a module, e.g., query analyzer 122, for subsequent data mining. For example, for each query-URL pair (i.e., the URL selected by executing that query), information is stored that indicates: (1) whether the webpage that corresponds to the URL contains term(s) in the executed query; and (2) whether the URL was selected by the user. This information may be used to improve QSS 110 and MLM 114, as well as the white list and black list described below.

White List

According to an embodiment of the invention, the original query is compared against queries that are specified in a "white list". A white list specifies queries that should be rewritten. Thus, the white list comprises multiple entries that may each comprise a "bad query"-to-"good query" pair. For example, the "Kelly Blue Book" to "Kelley Blue Book" pair may be specified in the white list, indicating that whenever "Kelly Blue Book" is received as a query, it should be rewritten to "Kelley Blue Book". Alternatively, at least some "bad" queries in the white list may not have any corresponding "good" query, which may indicate that search mechanism 106 at least should determine how to rewrite the original query without being required to determine whether to rewrite the original query. For example, the operations performed by modules 112-116 may be skipped and rewrite unit 118 uses the query suggestions from QSS 110 to determine how the original query should be rewritten.

In one embodiment, a "bad" query may be associated with multiple "good" queries, in which case the good queries are either (1) sent to the user as possible queries to execute or (2) executed with the results sent to the user. Alternatively, QSS 110 is bypassed and the multiple "good" queries are sent to FGM 112 to generate features and the process proceeds as is described above.

In one embodiment, comparing the original query to queries in the white list is performed before the query suggestions are generated. However, comparing the original query to queries in the white list may be performed at any other point in the query rewriting process, such as immediately before the features for each query suggestion are generated.

Generating and Updating a White List

A white list may be generated in multiple ways. One way to generate a white list is manually. However, manually composing a relatively comprehensive white list will take a significant amount of human labor. Furthermore, such a white list will always require updating and thus continual human involvement.

Another way to generate a white list is automatically through offline data mining. One such approach keeps track (e.g., using query analyzer 122) of whether second queries that are provided to a user are ever selected. For example, in the case where only references to second queries are sent to the user with original query results, if a reference to a particular second query is selected repeatedly and original query results are not (or at least very infrequently), then that particular original query-second query pair is added to the white list.

As another example, in the case where both original query results and second query results are sent to the user, if results of a particular second query are selected repeatedly and original query results are not, then that particular original query-second query pair is added to the white list.

A white list may be updated manually or automatically by deleting and/or updating entries. As an example of deleting an entry, suppose an entry in the white list comprises an original query but not a second query, indicating that the operations performed by modules 112-116 should be skipped. A situation may arise where the original query is ambiguous enough that the original query should not automatically be rewritten. In that case, the entry is deleted from the white list, indicating that the overall process should include modules 112-116 when the same query is later submitted.

As an example of updating an entry, suppose an entry in the white list comprises an original query and a second query, indicating that the operations performed by modules 110-118 may not be required at all. A situation may arise where the original query is ambiguous enough that the original query should not always be rewritten to the second query. In that case, the entry is modified to delete the second query, indicating that the operations performed by QSS 110 and RU 118 should be performed (i.e., how to rewrite the original query).

Black List

According to an embodiment of the invention, the original query is compared against queries that are specified in a "black list". The black list specifies queries that should not be rewritten, or at least should not be excluded from the set of possible query intents of the user.

For example, if the original query is "walmark", then, because "walmark" is a valid query, the actual results that are sent to the user include results of executing the query "walmark". Results of executing the query "walmart" may also be returned.

In one embodiment, comparing an original query to queries in the black list is performed before QSS 110 generates query suggestions. However, comparing an original query to queries in the black list may be performed at any other point in the query rewriting Generating and Updating a Black List A black list may be generated in multiple ways. If the black list is generated manually, then the drawbacks discussed above with respect to manually generating a white list are also an issue.

In one embodiment, a black list is generated automatically through offline data mining. One such approach keeps track (e.g., using query analyzer 122) of whether rewritten queries that are provided to a user are ever selected. For example, based on an original query, if a link to a second query is sent to users along with original query results and the link is never selected, then that particular original query is added to the black list.

As another example, if second query results are provided to users and the users repeatedly select to view the original query results (e.g., using the override feature described above), then the original query is added to the black list.

In another automatic approach, queries from a log of previously submitted queries are examined. Each query is executed against the search engine, as is done in a typical case without rewriting the query, and the webpages of the resulting references are examined. The number of webpages that contain the terms of the original query and none of the alternative terms (e.g., and that are not spam webpages) is divided by the total number of references returned by the original query. If the percentage is above a certain threshold, such as 98%, then that may signify enough confidence to add that query to the black list. For example, executing the query "walmark", the name of a legitimate company, will show that a high percentage of the resulting webpages do not contain the query term "walmart", indicating that "walmark" should be on the black list.

Even though a query may be in the black list, over time the query may become ambiguous. For example, suppose the company Walmark went out of business. As a result, webpages that previously referred to Walmark are either deleted or updated to no longer refer to Walmark. Consequently, searches with the query "walmark" may only yield spam webpages. Thus, the percentage of non-spam webpages that contain "walmark" and not "walmart" compared to all webpages that contain "walmark" may be very low, indicating that it is likely that users who submit queries with the word "walmark" intended to write "walmart" instead. Therefore, not only may a black list be updated by adding entries, but also by deleting entries.

Search Query Example

Figure 2:
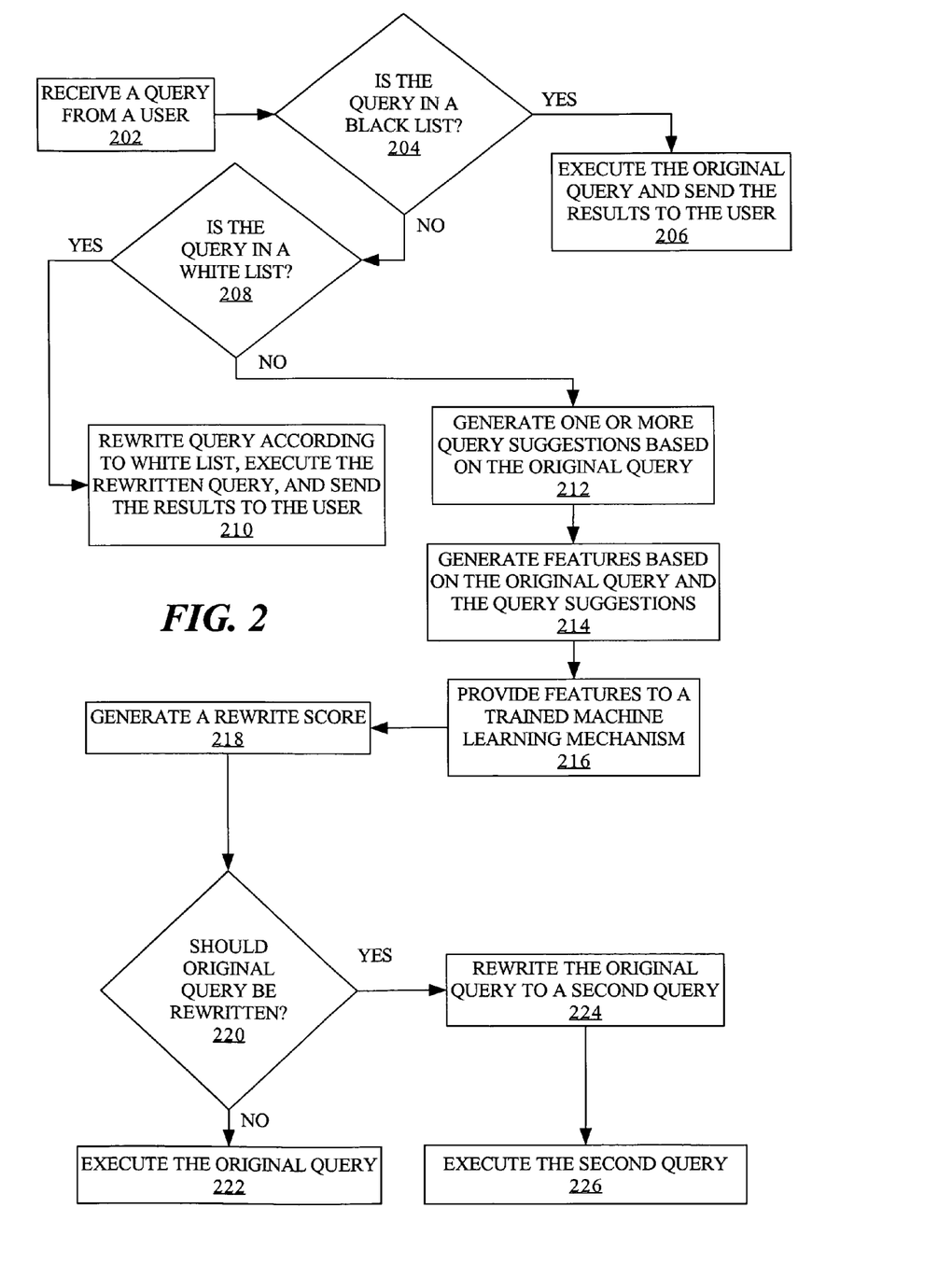
FIG. 2 is a flow diagram of processing a search query to determine whether the search query should be rewritten, according to an embodiment of the invention.

FIG. 2 is a flow diagram of processing a search query to determine whether the search query should be rewritten, according to an embodiment of the invention. Although the steps outlined in FIG. 2 are discussed in the context of particular components of search mechanism 106, other components of search mechanism 106 (shown or not shown) may perform the steps.

At step 202, search mechanism 106 receives a query from a user (e.g., at server 108). Suppose the query is "GARTH BOOKS"

At step 204, it is determined whether the query "GARTH BOOKS" is in a black list. If so, then, at step 206, the query "GARTH BOOKS" is executed and the results are sent to the user. If not, then the process proceeds to step 208.

At step 208, it is determined whether the "GARTH BOOKS" is in a white list. If so, then, at step 210, the query is rewritten to a second query (e.g., "GARTH BROOKS"), the second query is executed, and the results are sent to the user. If not, then the process proceeds to step 212.

At step 212, query suggestion server (QSS) 110 generates, based on "GARTH BOOKS", a set of one or more query suggestions that are each different than "GARTH BOOKS" and sends the query suggestions to feature generating mechanism (FGM) 112. Examples of query suggestions may be "GARTH BROOKS", "TONY GARTH BOOKS", and "JOHN GARTH BOOKS"

At step 214, FGM 112 generates features based on "GARTH BOOKS" and the query suggestions. At step 216, FGM 112 provides those features to trained machine learning mechanism (MLM) 114. At step 218, MLM 114 generates a rewrite score and provides the rewrite score to rewrite determination unit (RDU) 116.

At step 220, RDU 116 determines, based on the rewrite score, whether the original query should be rewritten to a different query that is more likely to produce search results that are consistent with an intent of the user. For example, the rewrite score may be 0.8 and the rewrite threshold value may be 0.75. Because 0.8 is greater than 0.75, then RDU 116 may determine to rewrite "GARTH BOOKS".

However, if RDU 116 determines that "GARTH BOOKS" should not be rewritten (e.g., the rewrite score is below the rewrite threshold value), then, at step 222, query executor 120 executes the original query and server 108 sends the original query results to the user.

If RDU 116 determines that "GARTH BOOKS" should be rewritten, then, at step 224, rewrite unit (RU) 118 rewrites "GARTH BOOKS" to a second query, such as "GARTH BROOKS". At step 226, query executor 120 executes the query "GARTH BROOKS" and server 108 sends the corresponding results to the user.

Hardware Overview

Figure 3:
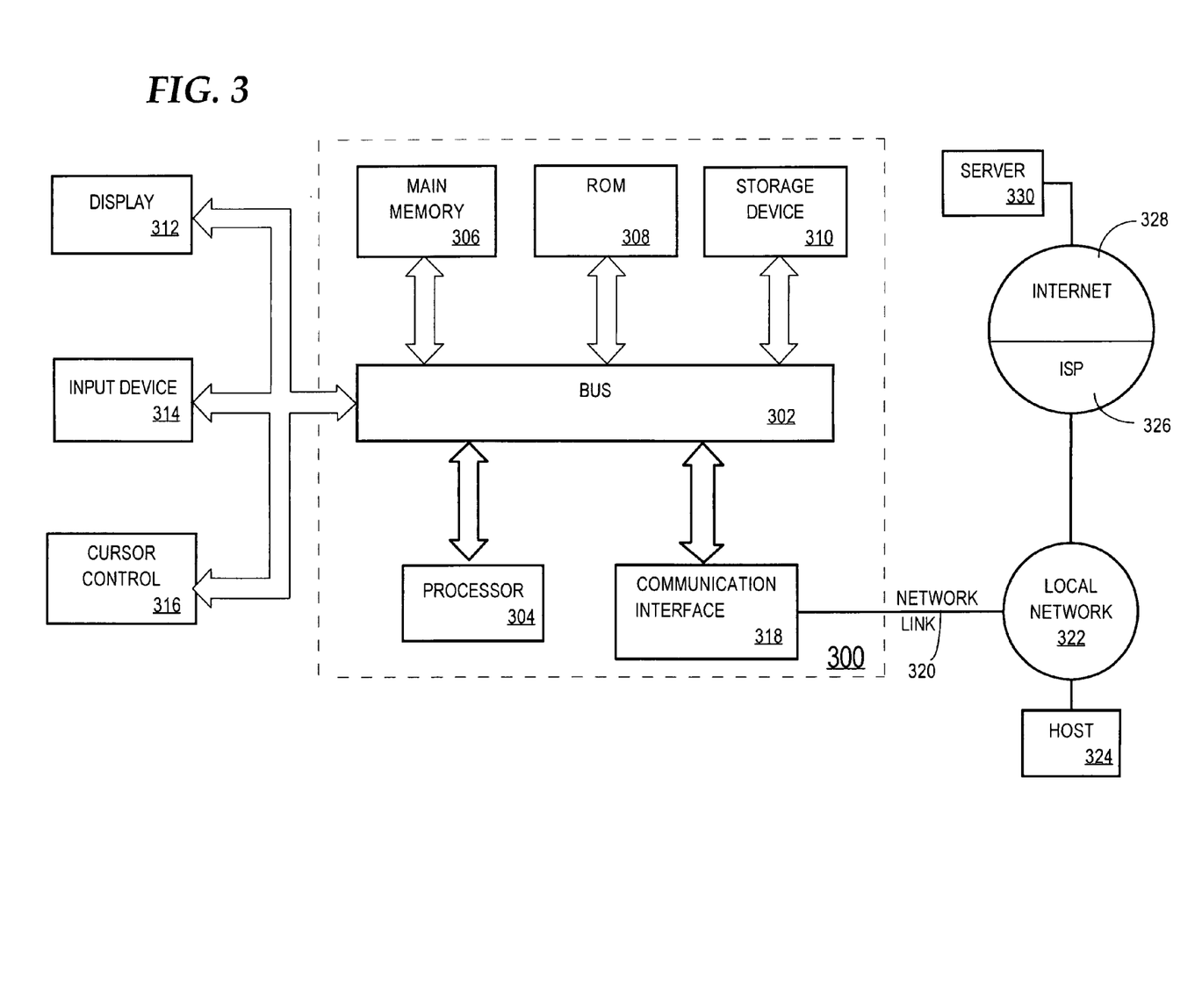
FIG. 3 is a block diagram of a computer system on which embodiments of the invention may be implemented.

FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another machine-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 300, various machine-readable media are involved, for example, in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution. In this manner, computer system 300 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method, comprising:

receiving a first query from a user;

based on the first query, generating a set of one or more query suggestions, wherein each query suggestion in the set is different than the first query;

generating a set of query features that are based, at least in part, on a set of suggestion features that are values associated with said set of query suggestions;

providing, to a trained machine learning mechanism, said set of query features to determine whether another query is more likely to produce search results that are consistent with an intent of the user;

in response to determining that another query is more likely to produce search results that are consistent with the intent of the user, determining to use a second query instead of the first query, wherein the second query is not identical to the first query.

2. A machine-readable storage medium storing one or more sequences of instructions which, when executed by one or more processors, causes the one or more processors to perform the method recited in claim 1.

3. The method of claim 1, wherein determining to use the second query includes rewriting the first query to the second query.

4. A machine-readable storage medium storing one or more sequences of instructions which, when executed by one or more processors, causes the one or more processors to perform the method recited in claim 3.

5. The method of claim 1, further comprising:
sending, to the user to be displayed, a reference to the second query;
in response to an indication that the user selected the reference, sending, to the user to be displayed, results based on executing the second query.

6. A machine-readable storage medium storing one or more sequences of instructions which, when executed by one or more processors, causes the one or more processors to perform the method recited in claim 5.

7. The method of claim 1, wherein the set of query features includes at least one of the following:
one or more confidence scores associated with a query suggestion in the set of query suggestions;
one or more confidence score associated with the first query.

8. A machine-readable storage medium storing one or more sequences of instructions which, when executed by one or more processors, causes the one or more processors to perform the method recited in claim 7.

9. The method of claim 1, further comprising:
comparing said first query against at least one of a first list of queries and a second list of queries, wherein each query in the first list indicates that said each query should be rewritten, wherein each query in the second list indicates that said each query should not be rewritten.

10. The method of claim 9, further comprising:
determining that the user selects a particular reference in said search results;
associating the particular reference with the first query or a query suggestion of the set, wherein execution of the first query or said query suggestion resulted in the particular reference being selected;
storing information that indicates the association; and
based on the information, generating or updating at least one of the first list and the second list.

11. A machine-readable storage medium storing one or more sequences of instructions which, when executed by one or more processors, causes the one or more processors to perform the method recited in claim 10.

12. A machine-readable storage medium storing one or more sequences of instructions which, when executed by one or more processors, causes the one or more processors to perform the method recited in claim 9.

13. The method of claim 1, wherein the second query includes one or more terms from the query suggestion associated with a higher score relative to other query suggestions in the set of one or more query suggestions.

14. The method of claim 13, wherein the second query further includes one or more terms from the first query.

15. A machine-readable storage medium storing one or more sequences of instructions which, when executed by one or more processors, causes the one or more processors to perform the method recited in claim 14.

16. A machine-readable storage medium storing one or more sequences of instructions which, when executed by one or more processors, causes the one or more processors to perform the method recited in claim 13.

17. The method of claim 1, wherein the second query includes terms from multiple query suggestions in the set of one or more query suggestions.

18. The method of claim 17, wherein the second query further includes one or more terms from the first query.

19. A machine-readable storage medium storing one or more sequences of instructions which, when executed by one or more processors, causes the one or more processors to perform the method recited in claim 18.

20. A machine-readable storage medium storing one or more sequences of instructions which, when executed by one or more processors, causes the one or more processors to perform the method recited in claim 17.

21. The method of claim 1, further comprising:
generating results based on executing the second query; and
sending said results to be displayed to the user.

22. A machine-readable storage medium storing one or more sequences of instructions which, when executed by one or more processors, causes the one or more processors to perform the method recited in claim 21.

23. The method of claim 21, wherein said results are also based on executing the first query.

24. A machine-readable storage medium storing one or more sequences of instructions which, when executed by one or more processors, causes the one or more processors to perform the method recited in claim 23.

25. The method of claim 21, wherein said results have been filtered to remove one or more references to one or more webpages that are associated with relevance scores that are lower relative to relevance scores that are associated with other webpages that are referenced by other references in said results.

26. A machine-readable storage medium storing one or more sequences of instructions which, when executed by one or more processors, causes the one or more processors to perform the method recited in claim 25.

27. The method of claim 21, further comprising:
sending, to the user to be displayed, a reference to the first query;
receiving an indication that the user selected the reference;
generating second results based on executing the first query; and
sending, to the user to be displayed, said second results.

28. A machine-readable storage medium storing one or more sequences of instructions which, when executed by one or more processors, causes the one or more processors to perform the method recited in claim 27.

29. The method of claim 21, wherein:
said results comprise references to a plurality of webpages;
the plurality of webpages are based on executing the second query and optionally the first query;
the method further comprising:
determining that the user selected a particular reference;
determining that the particular reference is a result of executing a particular query;
associating the particular reference with the particular query;
storing the association in a database of associations.

30. The method of claim 29, further comprising:
   training the trained machine learning mechanism based on the database of associations.

31. A machine-readable storage medium storing one or more sequences of instructions which, when executed by one or more processors, causes the one or more processors to perform the method recited in claim 30.

32. A machine-readable storage medium storing one or more sequences of instructions which, when executed by one or more processors, causes the one or more processors to perform the method recited in claim 29.

* * * * *